United States Patent [19]

Needham

[11] Patent Number: 5,367,025
[45] Date of Patent: Nov. 22, 1994

[54] CROSSLINKABLE POLYETHYLENE-BASED COMPOSITION FOR ROTATIONAL MOLDING

[75] Inventor: Donald G. Needham, Ramona, Okla.

[73] Assignee: Wedtech, (USA) Inc., Bartlesville, Okla.

[21] Appl. No.: 145,888

[22] Filed: Oct. 29, 1993

Related U.S. Application Data

[63] Continuation-in-part of Ser. No. 774,564, Oct. 8, 1991, Pat. No. 5,260,381.

[51] Int. Cl.$^5$ .................. C08L 23/04; C08L 23/26
[52] U.S. Cl. ...................... 525/166; 525/177; 524/513
[58] Field of Search .................. 525/166, 177

[56] References Cited

U.S. PATENT DOCUMENTS

| | | |
|---|---|---|
| 3,214,422 | 10/1965 | Mageli et al. . |
| 3,399,250 | 8/1968 | Kirk et al. . |
| 3,784,668 | 1/1974 | Neidinger . |
| 3,862,265 | 1/1975 | Steinkamp et al. . |
| 3,876,613 | 4/1975 | Needham et al. . |
| 3,974,114 | 8/1976 | Sowa . |
| 4,032,600 | 6/1977 | MacAdams et al. . |
| 4,187,212 | 2/1980 | Zinke et al. . |
| 4,267,080 | 5/1981 | Yokoyama et al. . |
| 4,275,180 | 6/1981 | Clarke .................. 525/176 |
| 4,582,656 | 4/1986 | Hoffmann . |
| 4,678,834 | 7/1987 | Boivin et al. .......... 525/177 |
| 4,900,792 | 2/1990 | Chen et al. . |
| 5,137,973 | 8/1992 | Khanna et al. ........ 525/177 |

FOREIGN PATENT DOCUMENTS

| | | | |
|---|---|---|---|
| 43022 | 1/1982 | European Pat. Off. ....... 525/177 |
| 87210 | 8/1983 | European Pat. Off. . |
| 49-35335 | 9/1974 | Japan . |
| 2209937 | 8/1990 | Japan ...................... 525/166 |
| 7101400 | 8/1972 | Netherlands . |

Primary Examiner—Carman J. Seccuro, Jr.
Attorney, Agent, or Firm—Timothy R. Kroboth

[57] ABSTRACT

A crosslinkable polyethylene-based composition useful for rotational molding and, when cured, beneficially characterized by exceptional percent elongation after long term exposure to degradation conditions, is provided. The composition advantageously includes a polyalkylene terephthalate as a polymeric additive.

19 Claims, No Drawings

CROSSLINKABLE POLYETHYLENE-BASED COMPOSITION FOR ROTATIONAL MOLDING

This patent application is a continuation-in-part of U.S. patent application Ser. No. 774,564, filed on Oct. 8, 1991, now U.S. Pat. No. 5,260,381.

FIELD OF THE INVENTION

This invention relates to thermoplastic polymers of ethylene suitable for fabrication into useful products, by rotational molding.

BACKGROUND OF THE INVENTION

Rotational molding, more commonly known as rotomolding, is generally used for molding hollow articles such as toys, sports equipment, fuel tanks, playground equipment, tanks for use in agriculture, refuse containers, and large chemical tanks. Many of these products are left out-of-doors, unprotected against the weathering elements of rain, and of heat and ultraviolet light from the sun.

To rotomold a part, powdered polyethylene or other plastic resin is placed inside a hollow mold, which is then closed and rotated on two axes, inside a heated oven to allow the powder to fuse together, forming a solid, hollow mass on the inside of the mold. The mold is then removed from the oven, to cool by air or water spray. After cooling, the molded part is removed, and more powder is placed inside the mold to begin another cycle. A more detailed discussion of rotomolding may be found in *Modern Plastics Encyclopedia* 1990, pages 317-318.

Polymers of ethylene, including homopolymers and copolymers, are often used in the rotomolding process. Into these polymers are frequently incorporated thermal stabilizers, ultraviolet absorbers and crosslinking agents. Known thermal stabilizers include a combination of thioesters, disclosed in U.S. Pat. No. 2,956,982, with an organophosphite and a hindered phenolic antioxidant. Some combinations of an organophosphite and a hindered phenolic antioxidant are disclosed in U.S. Pat. No. 4,187,212. Known ultraviolet stabilizers include 2-hydroxy-4-n-octoxybenzophenone, and a hindered amine such as poly[(6-morpholino-s-triazine-2,4-diyl)[(2,2,6,6-tetramethyl-4-piperidyl)imino]-hexamethylene[(2,2,6,6-tetramethyl-4-piperidyl)imino]] or bis(2,2,6,6-tetramethylpiperidine-4)sebacate, used separately or in combination.

Crosslinking agents may include a combination of organic peroxide initiator and a crosslinking co-agent. This combination is disclosed in U.S. Pat. No. 4,900,792 assigned to Allied-Signal and European Patent Application 87210 assigned to DuPont Canada. For rotomolding, dialkyl peroxides used are 2,5-dimethyl-2,5-di(t-butylperoxy)hexane or alpha,alpha'-bis(t-butylperoxy)-diisopropylbenzene or those disclosed in U.S. Pat. No. 3,214,422. Of those disclosed in the patent, 2,5-dimethyl-2,5-di(t-butylperoxy)hexane-3 is most commonly used. Co-agents used by those experienced in the art of crosslinking polyethylene, include triallyl cyanurate, triallyl isocyanurate, triallyl trimellitate, trimetholol-propane trimethacrylate, and related monomers.

There continues to be a need for a crosslinkable polyethylene-based composition suited for rotomolding applications and characterized, when cured, by long term thermal stability and resistance to ultraviolet light-induced photodegradation.

SUMMARY OF THE INVENTION

In accordance with the present invention, a crosslinkable polyethylene-based composition is provided. The composition is beneficially useful for rotomolding articles having improved long term properties.

The polyethylene base resin is a homopolymer, copolymer, or a combination of both. The composition beneficially includes an organic peroxide initiator, a suitable polymeric ester or ester group-bearing polymer additive, and a suitable crosslinking co-agent. Thermal stabilizers and one or more ultraviolet stabilizers are advantageously added.

The improved crosslinkable polyethylene-based composition hereof is particularly suited for rotomolding applications that produce products requiring long term thermal stability and resistance to ultraviolet light-induced photodegradation. The composition is of special value for rotomolded articles exposed out-of-doors for an extended period of time.

DETAILED DESCRIPTION OF THE INVENTION

As indicated above, the present invention relates to a novel crosslinkable polyethylene-based composition having superior long term physical properties.

Polymers useful for this invention are thermoplastic polymers of ethylene. Polyethylene homopolymers, ethylene copolymers, and a mixture of both are suitable for the crosslinkable compositions of this invention. The olefin polymer used in this invention, may be an ethylene homopolymer or ethylene copolymer comprised of a major part of ethylene monomer. Typically at least about 75% by weight of ethylene monomer will be used. Useful monomers for a minor part of the polyethylene-based resin include a C3-C8 alpha-olefin, typically an acyclic straight or branched chain olefin such as octene, hexene or butene.

Polyethylene homopolymer and ethylene copolymer compositions for rotomolding applications, are well known and described in U.S. Pat. Nos. 3,876,613 and 3,974,114, and European Patent Application 87210.

Preferred properties of the polyethylene base resin include a melt index of from about 10 to 50, preferably 10 to 30, gm/10 minutes as determined by ASTM D1238, condition "E". A suitable density is in the range of about 0.92 to 0.97, preferably 0.93 to 0.96, gm/cc as determined by the ASTM 1505 testing procedure.

Suitable crosslinking compounds are described in U.S. Pat. No. 3,214,422, issued to Mageli et al. These compounds are acetylenic diperoxy compounds and include well known hexynes and octynes. Useful organic peroxide initiators include the following:

2,7-dimethyl-2,7-di(t-butylperoxy)octadiyne-3,5
2,7-dimethyl-2,7-di(peroxyethylcarbonate)octadiyne-3,5
3,6-dimethyl-3,6-di(peroxyethylcarbonate)octyne-4
3,6-dimethyl-3,6-di(t-butylperoxy)octyne-4
2,5-dimethyl-2,5-di(peroxybenzoate)hexane-3
2,5-dimethyl-2,5-di(peroxy-n-propyl carbonate)hexane-3
2,5-dimethyl-2,5-di(peroxyisobutylcarbonate)hexane-3
2,5-dimethyl-2,5-di(peroxyethylcarbonate)hexane-3
2,5-dimethyl-2,5-di(alpha-cumylperoxy)hexane-3
2,5-dimethyl-2,5-di(peroxy beta-chloroethylcarbonate)hexane-3, and
2,5-dimethyl-2,5-di(t-butylperoxy)hexane-3.

Other suitable organic peroxide initiators are 2,5-dimethyl-2,5-di(t-butylperoxy)hexane and alpha,alpha'-bis(t-butylperoxy)diisopropylbenzene. The amount of the initiator will usually be in the range of from about 0.1 to 2, preferably 0.3 to 1, parts by weight based on 100 parts by weight of the ethylene polymer.

The composition of the present invention includes a polymeric additive which is beneficially a suitable polymeric ester or ester group-bearing polymer. Illustrative thereof are a polyalkylene benzenepolycarboxylate such as a polyethylene or polybutylene benzenedicarboxylate, and an ester group-bearing ethylenic polymer such as an ethylene vinyl ester copolymer, which may be used separately or in combination. It is believed that the outstanding properties described hereinafter, are imparted by the polymeric additive.

The term "polyalkylene benzenepolycarboxylate" as used herein, is used generally to include a polymer made by condensing an alkylene glycol including a lower alkyl group (typically, $C_2$–$C_4$) such as ethyleneglycol, with a benzenepolycarboxylic acid such as terephthalic acid or a polyalkylbenzenepolycarboxylate such as dimethylterephthalate. Furthermore, this term may include such a polymer modified by the inclusion of a minor amount, e.g., less than about 25 weight percent of the polymer, of co-monomers or modifying agents, as is well known. Well known co-monomers or modifying agents include various diols such as cyclohexanedimethanol and various diacids such as isophthalic acid. Illustrative polyalkylene benzenepolycarboxylates useful in the present invention, include polyethylene terephthalate (PET) and polybutylene terephthalate (PBT).

Vinyl ester content of a suitable ethylene vinyl ester copolymer should be in the range of from about 5 to 50, preferably 8 to 15 percent. A more preferable range is about 9 to 10 percent vinyl ester.

A suitable amount of the polymeric additive for use in the present invention depends upon factors including the desired product, the product specifications, the polymeric additive and crosslinking co-agent selected, and the amount of co-agent. Also important is whether a combination of polymeric additives is used.

Beneficially, at least about 0.2 parts by weight of the polymeric additive, based on 100 parts of ethylene polymer is used, with an upper limit of about 8 parts by weight of the polyalkylene benzenepolycarboxylate and of about 4 parts by weight of the ester group-bearing, ethylenic polymer being typically useful. When used in combination, the ratio of the polyalkylene benzenepolycarboxylate to the ethylenic polymer may vary considerably. Although either may form the major amount of a combination, cost considerations may dictate that the polyalkylene benzenepolycarboxylate comprise at least about 20 weight percent, preferably the major amount, even up to an about 50:1 or greater ratio.

Preferably from about 0.35 to 6 parts, very preferably from about 1 to 6 parts, by weight of the polyalkylene benzenepolycarboxylate may be employed. Preferably, in combination, from about 0.15 to 2 parts by weight of the ester group-bearing, ethylenic polymer may be used. The melt index of the ethylenic polymer should be in the range of about 1 to 50, preferably 2 to 10, gm/10 minutes for better dispersion into the base resin.

Generally speaking, crosslinkable polyethylene base resin is extrusion-processed at a temperature in the range of about 300° to 320° F. I have found that a polyalkylene benzenepolycarboxylate such as PET, does not adequately disperse into the base resin at processing temperatures normally used for extruding crosslinkable resin. Furthermore, I have found that when preblended with a suitable carrier using for instance an about 1:4 ratio, and a temperature in excess of the melt temperature of the additive, significantly improved physical properties result compared to the physical properties if direct addition of the polymeric additive is used at normal processing temperatures. Suitability of a carrier resin is based upon for instance, thermal stability at an appropriate preblending temperature and additive compatibility. If desired, base resin may be chosen as the carrier resin.

Useful crosslinking co-agents include allyl crosslinking co-agents and trimethacrylate compounds, and advantageously assist in suppression of bubble formation. Allyl carboxylates may be used. The allyl crosslinking co-agents may be allyl, diallyl and triallyl compounds. Preferred crosslinking co-agents are triallyl cyanurate, triallyl isocyanurate, triallyl trimellitate and trimethylolpropane trimethacrylate.

The amount of crosslinking co-agent to be used will vary upon factors similar to those controlling the amount of the polymeric additive, and will advantageously be sufficient to help suppress bubble formation. Beneficially, at least about 0.2 parts by weight, preferably about 0.25 to 1 part by weight, based on 100 parts of ethylene polymer is used. If desired, up to about 1.5 to 2 parts may be employed. A particularly useful combination is about 0.8 to 4 parts by weight of the polyalkylene benzenepolycarboxylate, about 0.2 to 0.75 parts by weight of the ethylenic polymer, and about 0.2 to 0.75 parts by weight of the co-agent.

Thermal stabilizers are advantageously included in a composition according to the present invention. Suitable thermal stabilizers are a thioester, an organophosphite, and a hindered phenolic antioxidant. These stabilizers may be used separately or in combination. A preferred thermal stabilizer system is a combination including a thioester which may be dilauryl thiodipropionate (DLTDP) or distearyl thiodipropionate (DSTDP). A preferred thioester is DLTDP in an amount of between 0.02 to 0.5, preferably 0.05 to 0.15, parts by weight based on 100 parts of polyethylene based resin. The second part of this combination is an organophosphite. Suitable phosphites are tris(2,4-di-t-butylphenyl)phosphite (I-168), trilauryl trithiophosphite (TLTTP) and bis(2,4-di-t-butylphenyl) pentaerythritol diphosphite (MDW-626). Of these phosphites, I-168 is preferred in an amount ranging from 0.02 to 2, preferably between 0.05 to 0.5, parts by weight based on 100 parts of ethylene polymer. The third part of this combination is a hindered phenolic antioxidant. A preferred hindered phenolic antioxidant is tetrakis[methylene-3-(3',5'-di-t-butyl-4'-hydroxyphenyl)propionate]methane (I-1010) or octadecyl-3-(3,5-di-t-butyl-4-hydroxyphenyl)propionate (I-1076). A preferred hindered phenolic antioxidant is I-1076 and a preferred amount is in the range of 0.01 to 0.1, more preferably 0.02 to 0.05, parts by weight based on 100 parts of polyethylene resin. A most preferred thermal stabilizer is a combination of DLTDP, I-168 and I-1076, for a crosslinkable polyethylene composition in accordance with the present invention.

The present invention beneficially includes ultraviolet stabilizers. Suitable ultraviolet stabilizers include benzophenone absorbers and hindered amine light stabilizers. These are frequently used separately, but are more effective when used in combination. A preferred benzophenone absorber is 2-hydroxy-4-n-octoxybenzophenone (UV-531), in an amount of between 0.1 to 1, preferably 0.3 to 0.5, parts by weight based on 100 parts of ethylene polymer base resin. A preferred hindered amine light stabilizer (HALS) is, but not limited to, poly[(6-morpholino-s-triazine-2,4-diyl)[(2,2,6,6-tetramethyl-4piperidyl)imino]-hexamethylene[(2,2,6,6-tetramethyl-4piperidyl)imino]] (UV3346) or bis(2,2,6,6-tetramethylpiperidine-4)sebacate (T-770). A preferred HALS for the crosslinkable composition is UV-3346 in an amount in the range of 0.05 to 5, preferably between 0.1 to 0.3, parts by weight based on 100 parts of ethylene polymer base resin. A combination of both benzophenone and HALS are preferred in the crosslinkable composition.

Other additives which may be also incorporated into the crosslinkable polyethylene composition include organic and inorganic colorants, anti-static agents, stearic acid and conventional processing aids, wax and fatty acid lubricants, and mineral fillers.

In the illustrations that follow and throughout this description, all parts and percentages are weight percent unless otherwise specified.

In Table I, samples 1-12 are crosslinkable polyethylene compositions processed by being melt compounded in an extruder, pelletized, ground to ±/−35 mesh powder, and then rotomolded in a 6"×6"×8" box mold. The wall thickness of the molded box was ±/−0.125". Test specimens were die-cut from the box for testing physical properties.

The thermal stabilizers in these compounds are 0.02 part I-1076 plus 0.1 part I-168 plus 0.05 part DLTDP. The ultraviolet stabilizers in these compounds are 0.1 part UV-3346 plus 0.3 part UV-531. These compounds also contain 0.05 part calcium stearate as a processing aid, to reduce surface tension. All parts are by weight and are based on 100 parts of polyethylene base resin.

Samples 1-6 of Table I are comparative to illustrate the effect of using EVA and TAC separately in a crosslinkable polyethylene composition. The physical properties of these compositions would not be adequate for many commercial rotomolding applications.

Samples 7-12 of Table I are crosslinkable polyethylene compositions containing both EVA and TAC, a well known crosslinking agent. These samples illustrate the improved physical properties obtainable by combining TAC with an ester group-bearing, ethylenic polymer. The GEL %, elongation and impact of samples 8-12 are greatly improved; however, the amount of TAC and EVA in sample 7 is not sufficient to obtain a high degree of crosslinking.

Elongation as measured by ASTM D638, is considered to be a key property of rotomolded articles. A high elongation is desired, as it indicates high ductility and good impact strength. The improved physical properties and higher degree of crosslinking, as measured by GEL %, are imparted by the ester group-bearing, ethylenic polymer, which is believed to create an environment for additional crosslinking from second and third generation reactions with a more random type of crosslinking or graft. The term "graft-effecting" is intended to describe an ester group-bearing, ethylenic polymer such as ethylene vinyl acetate, which provides a more random type of crosslinking sufficiently strong to maintain high elongation after long term exposure to degradation conditions.

In Table II, samples 1-7 are crosslinkable polyethylene compositions processed by being melt compounded in an extruder, pelletized, ground to ±/−35 mesh powder, then rotomolded in a 6"×6"×8" box mold. The wall thickness of the rotomolded box was ±/−0.125 inches. Test specimens were die-cut from the box for testing for physical properties.

The UVX samples were compression molded using a hydraulic press heated to 420° F. These samples were molded from the 35 mesh powder. Test specimens were die-cut from 0.035" sheets.

The thermal stabilizers in these compounds are 0.1 part I-168 plus 0.05 part DLTDP. The ultraviolet stabilizers in these compounds are 0.1 part UV-3346 plus 0.3 part UV-531. No stearate additive is used, as additive of this type is unnecessary; accordingly, it will be understood that a composition in accordance with the present invention may be free of a fatty acid salt, as described in U.S. Pat. No. 3,974,114 to Sowa and U.S. Pat. No. 4,900,792 assigned to Allied-Signal.

Samples 1-3 are comparative. The physical properties of these compositions would not be considered adequate for most rotomolding applications. The crosslinking bonds are too weak and the elongation drops sharply when these molded parts are exposed to an elevated

TABLE I

| | | | Physical Properties | | |
|---|---|---|---|---|---|
| SAMPLE | EVA | TAC | GEL (%) | ELONGATION (%) | IMPACT (ft/lb) |
| 1 | — | — | 54 | 160 | <20 |
| 2 | — | 0.1 | 74 | 210 | 30 |
| 3 | — | 0.2 | 83 | 235 | 35 |
| 4 | 0.1 | — | 59 | 200 | <20 |
| 5 | 0.2 | — | 65 | 260 | 30 |
| 6 | 0.3 | — | 68 | 285 | 45 |
| 7 | 0.1 | 0.1 | 74 | 260 | 35 |
| 8 | 0.2 | 0.1 | 80 | 285 | 45 |
| 9 | 0.3 | 0.1 | 82 | 285 | 50 |
| 10 | 0.1 | 0.2 | 85 | 320 | 60 |
| 11 | 0.2 | 0.2 | 88 | 415 | 65 |
| 12 | 0.3 | 0.2 | 92 | 640 | 75 |

Resin: Occidental Chemical Corporation
Polyethylene Homopolymer - TYPE: Alathon 7050
Density - 0.961 gm/cc. Melt Index - 17.3 gm/10 min.
Peroxide: 2,5-Dimethyl-2,5-di(t-butylperoxy)hexyne-3 0.6 parts by weight.
EVA = Ethylene/vinyl acetate copolymer.
Melt Index - 8 gm/10 min. Vinyl Acetate - 9%.
TAC = Triallyl Cyanurate.
Testing: ASTM-D2765 Test Procedure for Gel - Percent.
ASTM D638 Test Procedure for Elongation - Percent.
ARM Test Procedure for Impact at −40°.
All parts are based on 100 parts of Alathon base resin.

TABLE II

| | | | Physical Properties | | Long Term Properties | |
|---|---|---|---|---|---|---|
| | | | | | OVEN AGING 2000 hours | UVX 1000 hours |
| RUN | Co-agent | Graft | Impact (ft/lb) | Elongation | Elongation | Elongation |
| 1 | — | — | <10 | 95% | <10% | <10% |
| 2 | — | EVA | <20 | 150 | 20 | 45 |
| 3 | TAC | — | 45 | 290 | 60 | 160 |
| 4 | TAC + EVA | | >60 | >500 | 395 | 375 |

TABLE II-continued

| | | | | | |
|---|---|---|---|---|---|
| 5 | SR350 + EVA | >60 | >500 | 280 | 325 |
| 6 | TAIC + EVA | >60 | >500 | 425 | 410 |
| 7 | TATM + EVA | >60 | >500 | 485 | 425 |

Resin: Mobil Chemical Company
Polyethylene Copolymer - Ethylene/Hexene
TYPE: Mobil HMA-047
Density - 0.953 gm/cc. Melt Index - 20.2 gm/10 minutes.
Peroxide: 2,5-Dimethyl-2,5-di(t-butylperoxy)hexyne-3 0.6 parts by weight.
EVA: Ethylene/Vinyl Acetate copolymer.
Melt Index - 8 gm/10 min. Vinyl acetate - 9%.
TAC: Triallyl Cyanurate.
SR350: Trimethylolpropane Trimethacrylate.
TAIC: Triallyl Isocyanurate.
TATM: Triallyl Trimellitate.
OVEN AGING: Forced Draft oven at 140° F.
UVX: 0.035" Thick specimens, exposed to high intensity ultraviolet light at 310–320 nanometers. Compression molded test specimens.
EVA and Co-agents: Amount of each are 0.5 parts by weight based on 100 parts by weight of Mobil base resin.

TABLE III

| | | Physical Properties | | | Long Term Properties | |
|---|---|---|---|---|---|---|
| | | | | | OVEN AGING 2000 hours | UVX 1000 hours |
| SAMPLE | RESIN | Impact (ft/lb) | Gel | Elongation | Elongation | Elongation |
| 1 | Allied-Signal Paxon 7004 | 55 | 82% | 385% | <20% | 125% |
| 2 | DuPont Canada Sclairlink 8000 | 50 | 84 | 395 | 35 | 85 |

Paxon 7004 and Sclairlink 8000 are crosslinkable polyethylene-based compositions sold in powder form, ready for use in rotomolding.
The DuPont resin is no longer commercially available.
TESTING:
ARM Test procedure for Impact at −40°.
ASTM-D2765 Test procedure for Gel - Percent.
ASTM-D638 Test procedure for Elongation - Percent.
OVEN AGING: Forced Draft oven at 140° F.
UVX: Compression molded test specimens, 0.035" thickness.
Exposed to high untensity ultraviolet light at 310–320 nanometers.

TABLE IV

| PRE-BLEND | PET (%) | EVA-1 (%) | EVA-2 (%) | LLDPE-1 (%) | LLDPE-2 (%) | HDPE (%) |
|---|---|---|---|---|---|---|
| 1 | 20. | 80. | — | — | — | — |
| 2 | 20. | — | 80. | — | — | — |
| 3 | 20. | — | — | 80. | — | — |
| 4 | 20. | — | — | — | 80. | — |
| 5 | 20. | — | — | — | — | 80. |

TAC: Triallyl Cyanurate
PET: Polyethylene Terephthalate
Density - 1.2 gm/cc; Melt Index - 2 gm/10 minutes.
EVA-1: DuPONT Elvax 750. Melt Index - 8 gm/10 minutes.
Ethylene/Vinyl Acetate Copolymer, vinyl acetate content - 9.0%.
EVA-2: Quantum NA299. Melt Index - 2 gm/10 minutes.
Ethylene/Vinyl Acetate Copolymer, vinyl acetate content - 9.0%.
LLDPE-1: Novacor 0218. Melt Index - 2 gm/10 minutes; Density - 0.918 gm/cc Linear Low Density Polyethylene.
LLDPE-2: Exxon 8401. Melt Index - 3.5 gm/10 minutes; Density - 0.938 gm/cc Linear Low Density Polyethylene.
HDPE: Mobil HMA-047. Melt Index - 22 gm/10 minutes; Density - 0.953 gm/cc High Density Polyethylene.
PREBLEND is melt compounded at 500 F. in a 24/1 L/D extruder and pelletized to dilute and disperse the PET in the carrier resin.

TABLE V

| RUN NUMBER | PREBLEND (Table IV) | LOADING (wt/%) | GEL (%) | Physical Properties | | |
|---|---|---|---|---|---|---|
| | | | | TENSILE (psi) | ELONGATION (%) | IMPACT (ft/lbs) |
| 1 | 1 | 5 | 89 | 2680 | 640 | 70 |
| 2 | 2 | 5 | 90 | 2700 | 655 | 75 |
| 3 | 3 | 5 | 86 | 2560 | 490 | 65 |
| 4 | 4 | 5 | 83 | 2670 | 425 | 55 |
| 5 | 5 | 5 | 88 | 2520 | 520 | 65 |
| Control | — | 1 | 84 | 2710 | 315 | 45 |

Base resin: Mobil HMA-047. Polyethylene Copolymer: ethylene/hexene. Melt Index - 22 gm/10 minutes; Density - 0.953 gm/cc.
PET: Polyethylene Terephthalate Density - 1.2 gm/cc; Melt Index - 2 gm/10 minutes.
All blends contain:
TAC - 0.25%
Organic Peroxide - 0.6%
Hindered Phenol Antioxidant - 0.02%
Dilauryl Thiodipropionate - 0.1%
Benzophenone UV Absorber - 0.5%

TABLE VI

| SAMPLE | TAC (%) | PET (%) | EVA (%) | GEL (%) | TENSILE (PSI) | ELONGATION (%) | IMPACT (ft/lbs) |
|---|---|---|---|---|---|---|---|
| 1 | — | — | — | 49 | 2820 | 155 | <20 |
| 2 | 0.25 | — | — | 85 | 2740 | 220 | 35 |
| 3 | — | 0.25 | — | 44 | 2970 | 130 | <20 |
| 4 | — | — | 0.25 | 63 | 2770 | 240 | 35 |
| 5 | 0.25 | 0.25 | — | 78 | 2765 | 315 | 30 |
| 6 | 0.25 | 0.25 | 0.25 | 89 | 2410 | 485 | 65 |
| 7 | 0.25 | 0.50 | — | 86 | 2470 | 435 | 50 |
| 8 | 0.25 | 1.00 | — | 88 | 2520 | 520 | 65 |
| 9 | 0.25 | 2.00 | — | 88 | 2650 | 590 | 65 |
| 10 | 0.25 | 5.00 | — | 89 | 2710 | 655 | 70 |
| 11 | 0.25 | 10.00 | — | 84 | 2940 | 310 | 55 |

Base resin: Mobil HMA-047 Polyethylene Copolymer: ethylene/hexene Density - 0.953 gm/cc. Melt Index - 22 gm/10 minutes.
Peroxide: 2,5-Dimethyl-2,5-di(t-butylperoxy)hexene-3 Peroxide Content - 0.6 weight percent.
Antioxidants: Hindered phenol. Irganox 1076 - 0.02 weight percent.
Dilauryl Thiodipropionate - 0.1 weight percent.
Ultraviolet Absorber: Cyasorb UV-531 - 0.5 weight percent. 2-Hydroxy-4-n-octoxybenzophenone.
TAC: Triallyl Cyanurate
PET: Polyethylene Terephthalate Density - 1.2 gm/cc; Melt Index - 2 gm/10 minutes
EVA: Ethylene/Vinyl Acetate Copolymer, vinyl acetate content - 9% Melt Index - 8 gm/10 minutes

TABLE VII

| SAMPLE | TAC (%) | TATM (%) | PET (%) | EVA (%) | GEL (%) | TENSILE (PSI) | ELONGATION (%) | IMPACT (ft/lbs) |
|---|---|---|---|---|---|---|---|---|
| 1 | 0.25 | — | 0.25 | 0.10 | 82 | 2540 | 360 | 35 |
| 2 | 0.25 | — | 0.10 | 0.25 | 89 | 2545 | 480 | 65 |
| 3 | 0.25 | — | 1.00 | 0.25 | 90 | 2570 | 545 | 70 |
| 4 | 0.10 | — | 1.00 | 0.25 | 76 | 2710 | 370 | 35 |
| 5 | 0.50 | — | 1.00 | 0.25 | 92 | 2490 | 620 | 60 |
| 6 | — | 0.25 | 1.00 | 0.25 | 88 | 2495 | 570 | 70 |

Note: Sample 4 had small bubbles in the wall of the molded part.
Base Resin: Mobil HMA-047 Polyethylene Copolymer: ethylene/hexene Density - 0.953 gm/cc.
Melt Index - 22 gm/10 minutes.
Peroxide: 2,5-Dimethyl-2,5-di(t-butylperoxy)hexene-3
Peroxide Content - 0.6 weight percent.
Antioxidants: Hindered phenol. Irganox 1076 - 0.02 weight percent.
Dilauryl Thiodipropionate - 0.1 weight percent.
Ultraviolet Absorber: Cyasorb UV-531 - 0.5 weight percent.
2-Hydroxy-4-n-octoxybenzophenone.
TAC: Triallyl Cyanurate.
TATM: Triallyl Mellitate
PET: Polyethylene Terephthalate. Density - 1.2 gm/cc.
Melt Index - 2 gm/10 minutes.
EVA: Ethylene/Vinyl Acetate Copolymer, vinyl acetate content - 9%. Melt Index - 8 gm/10 minutes.

temperature or ultraviolet light.

Samples 4-7 illustrate the improved long term physical properties obtained when using a very preferred amount, that is, 0.4 to 1 part by weight, of the ester group-bearing, ethylenic polymer, in combination with a very preferred amount, that is, 0.4 to 1 part by weight, of the crosslinking co-agent.

In contrast, 1,2-polybutadiene as the crosslinking co-agent in an amount up to 1 part, did not produce adequate long term properties. Accordingly, a crosslinkable polyethylene composition in accordance with the present invention, would not beneficially include 1,2-polybutadiene. See U.S. Pat. No. 4,267,080 to Yokoyama, in which the crosslinking aid may be 1,2-polybutadiene. Additionally, it would not be beneficial to include 5 to 50 parts by weight of a rubber or elastomer, as taught by Yokohama.

Oven aging in a forced-draft oven at 140° F., is considered to be an accelerated test for measuring thermal stability. UVX is an accelerated test of high intensity ultraviolet light, in the range of 310 to 320 nanometers, where polyethylene is most sensitive to ultraviolet light-induced photodegradation.

As can be seen from Table II, samples 4-7 show a significant improvement in long term properties. In particular, high elongation is maintained after long term exposure to degradation conditions. A distinguishing feature is that when cured, elongation greater than 200% after long term exposure to elevated temperature or high intensity ultraviolet light, is maintained. By long term exposure is meant 2000 hours (elevated temperature, at 140° F.) or 1000 hours (high intensity ultraviolet light, in the range of 310-320 nanometers). Preferably, the elongation after long term exposure to such degradation conditions, is greater than about 300 percent.

In contrast, the elongation of the commercial resins of Table III is found to drop sharply when evaluated after long term exposure to elevated temperature or high intensity ultraviolet light.

In Table IV, preblends of PET are made using the five carrier resins shown. These carrier resins are suitable for forming preblends because of stability at an appropriate preblending temperature and compatibility with PET. A preblend is used because PET is found not to disperse into the high density, polyethylene base resin at the 300° to 320° F. processing temperature normally used for extruding crosslinkable resin. The compositions of Table IV are preblended at a temperature in excess of the melt temperature of PET, in particular at 500° F.

With reference to Table V, samples 1-5 are made by letting down the corresponding preblends of Table IV, to a level of 1% PET and 4% carrier resin in the base resin. The Control Sample is made by direct addition of 1% PET into the base resin; in other words, no preblend is formed. All samples are melt compounded at 300° F. by extruding the resulting mixture of base resin, additives and PET, and pelletizing. The pellets are ground to 35 mesh powder and rotational molded into test boxes, which are cut up for testing physical properties.

Samples 1 and 2, which contain both PET and EVA, show the best physical properties. Comparison of Sample 5 and the Control Sample shows significantly improved GEL %, elongation and impact, using a preblend of PET compared to direct addition of PET.

With reference to Table VI, in the case of the PET-containing compositions, PET is first preblended by extruding at 500° F. with 80% base resin, and is then let down to the indicated level by re-extruding at 300° F. with additional base resin and with the indicated additives, and is thereafter pelletized. In the other compositions, the indicated mixture is formed and melt compounded at 300° F. by extruding and pelletizing. In all cases, the pellets are ground to 35 mesh powder and rotational molded into test boxes, which are cut up for testing physical properties.

Sample 1 shows the physical properties of the base resin without crosslinking co-agent or the polymeric additive. Samples 2–4 illustrate the effect of the co-agent or polymeric additive when used separately. The remaining samples show good physical properties for a mixture of 0.25% PET, 0.25% EVA, and 0.25% TAC, and for a mixture of 0.50% to 5% PET and 0.25% TAC.

With reference to Table VII, PET is preblended as earlier described, and the formulations with the indicated additives are extruded at 300° F. The results of the testing are shown in Table VII.

The present invention may be carried out with various modifications without departing from the spirit or essential attributes thereof, and accordingly, reference should be made to the appended claims, rather than to the foregoing specification as indicating the scope of the invention.

I claim:

1. A crosslinkable polyethylene-based, rotomolding composition comprising a thermoplastic polymer of ethylene selected from the group consisting of an ethylene homopolymer, an ethylene copolymer comprising a C3–C8 alpha-olefin, and mixtures thereof, said ethylene homopolymer and copolymer each having a density in the range of about 0.92 to 0.97 gm/cc;

a crosslinking amount of an organic peroxide initiator;

at least about 0.2 parts by weight based on 100 parts of the ethylene polymer, of a polyalkylene benzenepolycarboxylate, wherein said polyalkylene benzenepolycarboxylate is used in an amount of up to about 8 parts by weight; and from about 0.2 to 2 parts by weight based on 100 parts of the ethylene polymer, of a suitable crosslinking co-agent.

2. The composition of claim 1, wherein said polyalkylene benzenepolycarboxylate is a polyalkylene benzenedicarboxylate.

3. The composition of claim 2, wherein said polyalkylene benzenedicarboxylate is polyethylene terephthalate.

4. The composition of claim 1, further comprising an ethylene vinyl ester copolymer in an amount of up to about 4 parts by weight.

5. The composition of claim 4, wherein said ethylene vinyl ester copolymer is an ethylene/vinyl acetate copolymer with a vinyl acetate content of from about 5 to by weight.

6. The composition of claim 1, wherein said polyalkylene benzenepolycarboxylate is present in an amount ranging from about 0.35 to 6 parts by weight.

7. The composition of claim 6, wherein said polyalkylene benzenepolycarboxylate is present in an amount ranging from about 1 to 6 parts by weight.

8. The composition of claim 1, wherein said crosslinking co-agent is present in an amount of from about 0.25 to 1 part by weight.

9. The composition of claim 1, wherein said crosslinking co-agent is selected from an allyl crosslinking co-agent and a trimethacrylate compound.

10. The composition of claim 9, wherein said allyl crosslinking co-agent is selected from the group consisting of triallyl cyanurate, triallyl isocyanurate and triallyl trimellitate.

11. The composition of claim 9, wherein said crosslinking co-agent is a trimethacrylate compound.

12. The composition of claim 1, further comprising an ultraviolet degradation stabilizing amount of at least one suitable ultraviolet stabilizer.

13. The composition of claim 1, further comprising a thermal degradation stabilizing amount of at least one suitable thermal stabilizer.

14. The composition of claim 1, wherein said ethylene homopolymer and copolymer each have a density in the range of about 0.93 to 0.96 gm/cc.

15. The composition of claim 1 made by preblending said polyalkylene benzenepolycarboxylate prior to extrusion-compounding said composition.

16. The composition of claim 4, wherein said ethylene vinyl ester copolymer is present in an amount of at least about 0.15 parts by weight based on 100 parts of the ethylene polymer.

17. The composition of claim 16, wherein said polyalkylene benzenepolycarboxylate is present in an amount ranging from about 0.35 to 6 parts by weight.

18. The composition of claim 17, wherein said polyalkylene benzenepolycarboxylate is present in an amount ranging from about 1 to 6 parts by weight.

19. The composition of claim 16, wherein said ethylene vinyl ester copolymer is present in an amount of up to about 2 parts by weight.

* * * * *